US009659248B1

(12) United States Patent
Barbosa et al.

(10) Patent No.: US 9,659,248 B1
(45) Date of Patent: May 23, 2017

(54) MACHINE LEARNING AND TRAINING A COMPUTER-IMPLEMENTED NEURAL NETWORK TO RETRIEVE SEMANTICALLY EQUIVALENT QUESTIONS USING HYBRID IN-MEMORY REPRESENTATIONS

(71) Applicant: International Business Machines Corporation, Armonk, NY (US)

(72) Inventors: Luciano de Andrade Barbosa, Rio de Janeiro (BR); Daria Bogdanova, Dublin (IE); Matthias Kormaksson, Rio de Janeiro (BR); Cicero Nogueira dos Santos, White Plains, NY (US); Bianca Zadrozny, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/000,647

(22) Filed: Jan. 19, 2016

(51) Int. Cl.
*G06N 3/04* (2006.01)
*G06N 3/08* (2006.01)
*G06F 17/28* (2006.01)

(52) U.S. Cl.
CPC .......... *G06N 3/0472* (2013.01); *G06F 17/28* (2013.01); *G06N 3/08* (2013.01)

(58) Field of Classification Search
None
See application file for complete search history.

(56) References Cited

U.S. PATENT DOCUMENTS

| 7,689,520 B2* | 3/2010 | Burges .............. G06F 17/30864 706/12 |
| 2007/0083359 A1 | 4/2007 | Bender |
| 2010/0010895 A1 | 1/2010 | Gabrilovich et al. |
| 2016/0110343 A1* | 4/2016 | Kumar Rangarajan Sridhar ............... G06F 17/2715 704/9 |

FOREIGN PATENT DOCUMENTS

| EP | 1107229 A2 | 6/2001 |
| WO | WO2015042536 A1 | 3/2015 |

OTHER PUBLICATIONS

Jeon, J. et al. "Finding similar questions in large question and answer archives." Proceedings of the 14th ACM international conference on Information and knowledge management. ACM, 2005.*

(Continued)

*Primary Examiner* — Kakali Chaki
*Assistant Examiner* — Eric Nilsson
(74) *Attorney, Agent, or Firm* — Scully, Scott, Murphy & Presser, P.C.; Louis J. Percello, Esq.

(57) ABSTRACT

Determining semantically equivalent text or questions using hybrid representations based on neural network learning. Weighted bag-of-words and convolutional neural networks (CNN) based distributed vector representations of questions or text may be generated to compute the semantic similarity between questions or text. Weighted bag-of-words and CNN based distributed vector representations may be jointly used to compute the semantic similarity. A pair-wise ranking loss function trains neural network. In one embodiment, the (Continued)

parameters of the system are trained by minimizing a pair-wise ranking loss function over a training set using stochastic gradient descent (SGD).

19 Claims, 4 Drawing Sheets

(56) References Cited

OTHER PUBLICATIONS

Rowley, H. et al. "Neural network-based face detection." IEEE Transactions on pattern analysis and machine intelligence 20.1 (1998): 23-38.*
Y. Kim, "Convolutional neural networks for sentence classification", Proceedings of the 2014 Conference on Empirical Methods in Natural Language Processing (EMNLP), Doha, Qatar, Oct. 25-29, 2014, pp. 1746-1751.
C. Nogueira Dos Santos, et al., Deep convolutional neural networks for sentiment analysis of short texts, Proceedings of Coling 2014, the 25th International Conference on Computational Linguistics: Technical Papers, Dublin, Ireland, Aug. 23-29, 2014, pp. 69-78.
N. Kalchbrenner, et al., "A convolutional neural network for modelling sentences", Proceedings of the 52nd Annual Meeting of the Association for Computational Linguistics, Baltimore, USA, Jun. 2014, 11 pages.
J. Weston, et al., "#Tagspace: Semantic embeddings from hashtags" Proceedings of the 2014 Conference on Empirical Methods in Natural Language Processing (EMNLP), Doha, Qatar, Oct. 25-29, 2014, pp. 1822-1827.
J. Jeon, et al., "Finding similar questions in large question and answer archives", Proceedings of the 14th ACM International conference on Information and Knowledge Management (CIKM), Bremen, Germany, Oct. 31-Nov. 5, 2005, 8 pages.
Z. Ji, et al., "Question-answer topic model for question retrieval in community question answering" CIKM '12 Proceedings of the 21st ACM international conference on Information and knowledge management, Oct. 29-Nov. 2, 2012, Maui, HI, USA, pp. 2471-2474.
X. Xue, et al., "Retrieval models for question and answer archives", Proceedings of the 31st Annual International ACM SIGIR Conference on Research and Development in Information Retrieval (SIGIR 2008), Singapore, Jul. 20-24, 2008, pp. 475-482.
L. Cai, et al., "Learning the latent topics for question retrieval in community QA", Proceedings of the 5th International Join Conference on Natural Language Processing, Chiang Mai, Thailand, Nov. 8-13, 2011, pp. 273-281.
G. Zhou, et al., "Improving question retrieval in community question answering using world knowledge", Proceedings of the Twenty-Third international joint conference on Artificial Intelligence, Aug. 3, 2013, pp. 2239-2245.
Grace Period Disclosure under 35 U.S.C. § 102(b)(1)(A)—C. Dos Santos, et al., "Learning hybrid representations to retrieve semantically equivalent questions", Proceedings of the 53rd Annual Meeting of the Association for Computational Linguistics and the 7th International Joint Conference on Natural Language Processing (Short Papers), Beijing, China, Jul. 26-31, 2015, pp. 694-699.

* cited by examiner

MACHINE LEARNING AND TRAINING A COMPUTER-IMPLEMENTED NEURAL NETWORK TO RETRIEVE SEMANTICALLY EQUIVALENT QUESTIONS USING HYBRID IN-MEMORY REPRESENTATIONS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE: Learning Hybrid Representations to Retrieve Semantically Equivalent Questions, Cicero dos Santos, Luciano Barbosa, Dasha Bogdanova, Bianca Zadrozny, Proceedings of the 53rd Annual Meeting of the Association for Computational Linguistics and the 7th International Joint Conference on Natural Language Processing (Short Papers), pages 694-699, Beijing, China, Jul. 26-31, 2015.

FIELD

The present application relates generally to computers and computer applications, and more particularly to computer-implemented natural language processing, neural networks and training a machine to recognize questions in question answering systems.

BACKGROUND

Online question and answer (Q&A) community web sites, for example, on the Internet can receive questions and retrieve answers in a variety of fields. Searching for similar questions in online question and answer (Q&A) community web sites for answers is a difficult task because different users may formulate the same question in a variety of ways, using different vocabulary and structure. For instance, the same question can be rephrased in many different ways and two questions may be different but may refer implicitly to a common problem with the same answer. Many Q&A community sites, however, advise users before posting a new question to search for similar questions.

BRIEF SUMMARY

A computer-implemented method and system of searching for semantically equivalent questions using hybrid representations in a computer-implemented community of question and answer system may be provided. The method, in one aspect, may include receiving a first question in natural language via a user interface. The method may also include parsing the first question into tokens using a natural language processing technique. The method may further include generating weighted bag of words representation of the first question based on the tokens, wherein weights associated with the bag of words are determined by training a neural network to learn the weights. The method may also include generating convolutional neural networks based distributed vector representation of the first question based on the tokens, wherein parameters of the convolutional neural networks based distributed vector representation are determined by training the neural network to learn the parameters. The method may also include retrieving a second question from a pool of questions, wherein the second question is represented in weighted bag of words representation and convolutional neural networks based distributed vector representation. The method may further include determining semantic similarity between the first question and the second question as a function of a first similarity computed based on the weighted bag of words representations of the first question and the second question, and a second similarity computed based on the convolutional neural networks based distributed vector representations of the first question and the second question, wherein parameters attributed to the first similarity and the second similarity in the function are learned by the neural network.

A system of searching for semantically equivalent questions using hybrid representations in a computer-implemented community of question and answer system, in one aspect, may include one or more hardware processors operable to receive a first question in natural language via a user interface over a communication network. One or more of the hardware processors may be further operable to parse the first question into tokens using a natural language processing technique. One or more hardware processors may be further operable to generate weighted bag of words representation of the first question based on the tokens, wherein weights associated with the bag of words are determined by training a neural network to learn the weights. One or more hardware processors may be further operable to generate convolutional neural networks based distributed vector representation of the first question based on the tokens, wherein parameters of the convolutional neural networks based distributed vector representation are determined by training the neural network to learn the parameters. One or more hardware processors may be further operable to retrieve a second question from a pool of questions, wherein the second question is represented in weighted bag of words representation and convolutional neural networks based distributed vector representation. One or more hardware processors may be further operable to determine semantic similarity between the first question and the second question as a function of a first similarity computed based on the weighted bag of words representations of the first question and the second question, and a second similarity computed based on the convolutional neural networks based distributed vector representations of the first question and the second question, wherein function parameters attributed to the first similarity and the second similarity in the function are learned by the neural network.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A computer-implemented system, method, and techniques may be provided that retrieve semantically equivalent questions using hybrid representations. A system and method in one embodiment may be based on a neural network, and generate weighted bag-of-words and convolutional neural networks (CNN) based distributed vector representations of questions to compute the semantic similarity between questions. A system and method in one embodiment may jointly use weighted bag-of-words and CNN based distributed vector representations to compute semantic similarity between questions. A system and method in one embodiment may use a pair-wise ranking loss function to train the parameters of Neural Network that employs hybrid representations. In one embodiment, the parameters of the system are trained by minimizing a pair-wise ranking loss function over a training set using stochastic gradient descent (SGD). While the description herein refers to questions and semantic equivalence of questions, the methodology of the present disclosure may apply to any text or sentences.

In one embodiment of the present disclosure, two questions are considered as semantically equivalent if they can be adequately answered by the exact same answer. Given a large set of questions Q and a new target question q, the task of retrieving semantically equivalent questions may include ranking the questions in Q according to their semantic similarity to q. A question includes a sequence of words in a natural language, e.g., English language. Given a large set of questions Q and a new target question q, a methodology of the present disclosure in one embodiment may rank the questions in Q according to their semantic similarity to q, based on bag-of-words representations and CNN-based distributed vector representation of texts.

Figure 1:
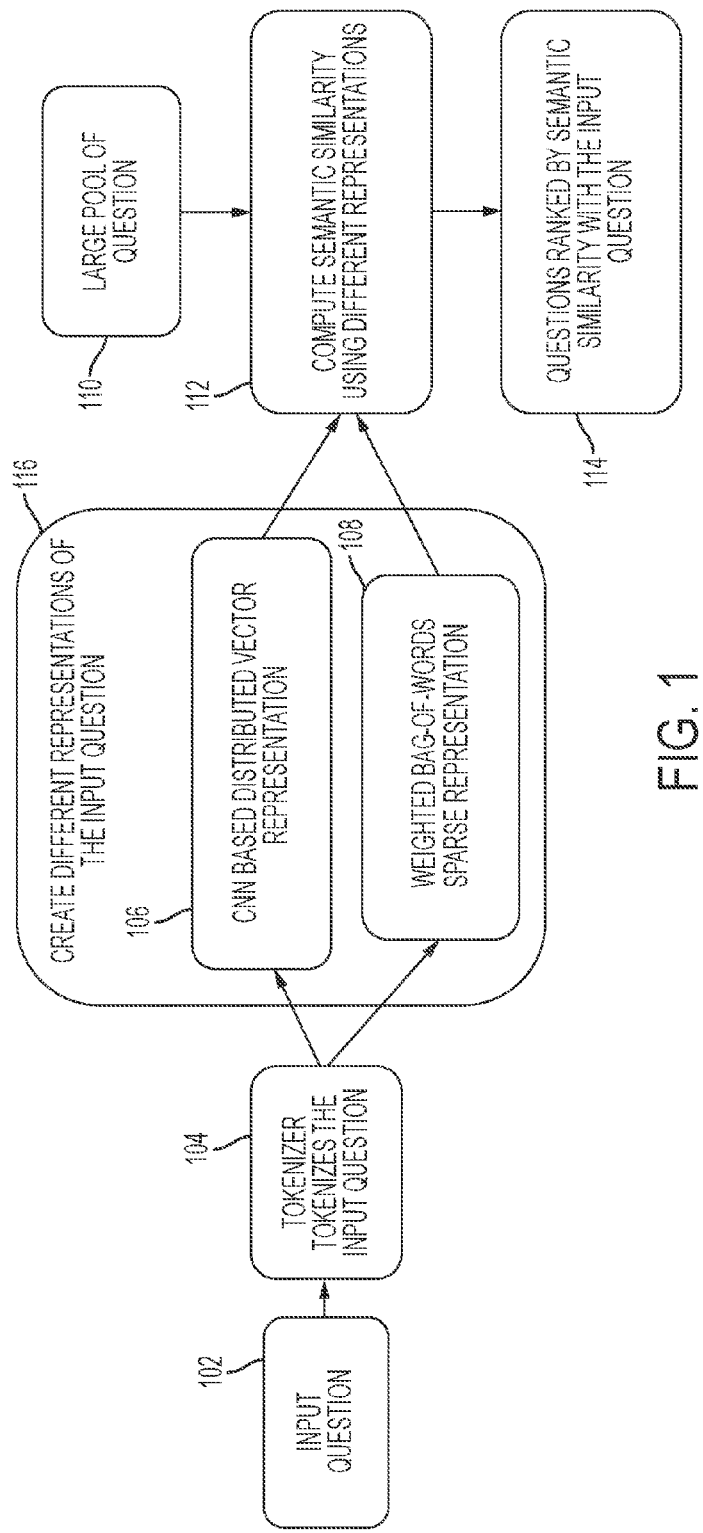
FIG. 1 is a diagram illustrating a computer-implemented method of learning hybrid representations and retrieving semantically equivalent questions in one embodiment of the present disclosure.

FIG. 1 is a diagram illustrating a computer-implemented method of learning hybrid representations in retrieving semantically equivalent questions in one embodiment of the present disclosure. The method may be performed or executed on one or more processors, for example, a central processing unit, coupled with a memory device. At 102, an input question is received, for example, via a user interface. For instance, an input question may be received over a communication network such as the Internet, for example, to a Q&A system or a search engine or the like.

At 104, the question is parsed and tokenized into tokens or words, for example, by a processor executing a natural language processing technique. For instance, a Q&A system or a search engine running on one or more hardware processors, may receive the input question and process it.

At 116, different representations of the input question are created. For example, at 106, CNN based distributed vector representation is created. The parameters of the CNN based distributed vector representation are learned by a neural network in one embodiment of the present disclosure. That is, a neural network is trained to learn the parameters of the CNN based distributed vector representation. Generating a CNN based distributed vector representation is described below with reference to 204 in FIG. 2 in one embodiment. At 108, weighted bag-of-words sparse representation is created. The weights are learned by a neural network in one embodiment of the present disclosure. That is, a neural network is trained to learn the weights. Generating a bag-of-words representation for a given question q is shown at 202 in FIG. 2 in one embodiment.

Figure 2:
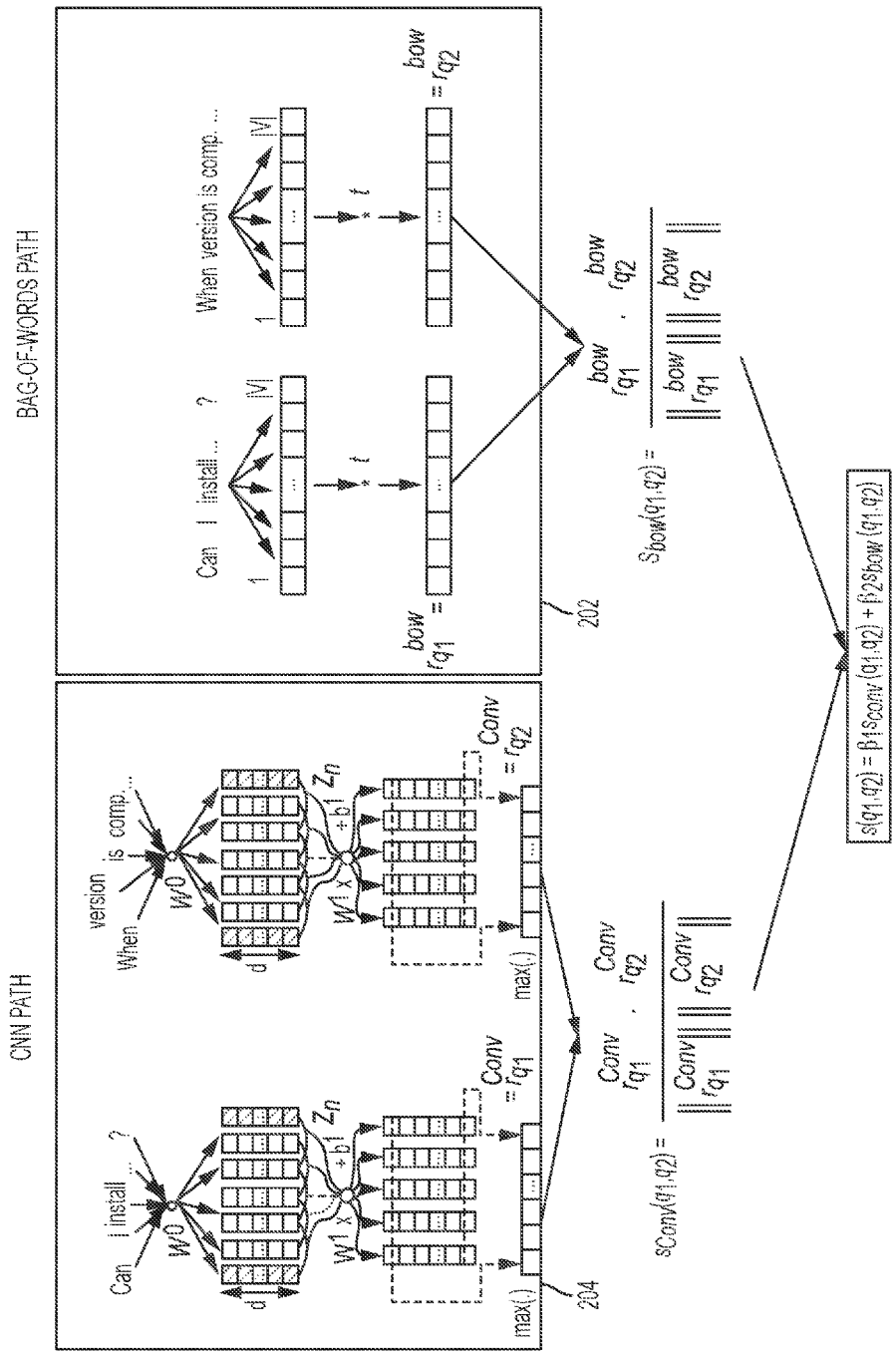
FIG. 2 shows a neural network for retrieving semantically equivalent questions using hybrid representations in one embodiment of the present disclosure.

FIG. 2 shows a neural network for retrieving semantically equivalent questions using hybrid representations in one embodiment of the present disclosure. In one embodiment, a feed forward processing calculates the similarity between a pair of questions ($q_1$, $q_2$). For performing this task, in one embodiment of the present disclosure, each question q follows two parallel paths, for example, non-word order characterization such as bag-of-words (BOW) and word order characterization such as CNN. Each path produces a distinct vector representation of q. For example, the BOW path produces a weighted bag-of-words representation of the question, $r^{bow}_q$, where the weight of each word in the vocabulary V is learned by the neural network. The CNN path, uses a convolutional approach to construct a distributed vector representations, $r^{conv}_q$, of the question. After producing the BOW and CNN representations for the two input questions, the system and/or method of the present disclosure in one embodiment computes two partial similarity scores $s_{bow}$(q1, q2), for the BOW representations, and $s_{conv}$(q1, q2), for the CNN representations. The system and/or method of the present disclosure in one embodiment combines the two partial scores to create the final score s(q1, q2).

A generation of the bag-of-words representation for a given question q is shown at 202. In one embodiment, a sparse vector $q^{bow} \in R^{|V|}$ may be created that contains the frequency in q of each word of the vocabulary. Weighted bag-of-words representation may be computed by performing the element-wise vector multiplication:

$$r^{bow}_q = q^{bow} * t$$

where the vector $t \in R^{|V|}$, contains a weight for each word in the vocabulary V. The vector t is a parameter to be learned by the network. This is closely related to the term frequency-inverse document frequency (TFIDF) text representation. In one embodiment, t may be fixed to the vector of inverse document frequency (IDF), which corresponds to the TFIDF representation.

An embodiment of a CNN path is shown at 204. The first layer of the CNN path transforms words into representations that capture syntactic and semantic information about the words. Given a question having N words q={$w_1$, ..., $w_N$}, every word $w_n$ is converted into a real-valued vector $r^w_n$. For each question, the input to the next neural network (NN) layer is a sequence of real-valued vectors $q^{emb}$={$r^{w_1}$, ..., $r^{w_N}$}. Word representations are encoded by column vectors in an embedding matrix $W^0 \in R^{d \times |V|}$, where V is a fixed-sized vocabulary. The next step in the CNN path includes creating distributed vector representations $r^{conv}_{q1}$ and $r^{conv}_{q2}$ from the word embedding sequences $q_1^{emb}$ and $q_2^{emb}$. This may be performed by using a convolutional layer to create sentence-level representations. More specifically, given a question $q_1$, the convolutional layer applies a matrix-vector operation to each window of size k of successive windows in $q_1^{emb}$={$r^{w_1}$, ..., $r^{w_N}$}. In one embodiment, the vector $z_n \in R^{dk}$ may be defined as the concatenation of a sequence of k word embeddings, centralized in the n-th word:

$$z_n = (r^{w_{n-(k-1)/2}}, \ldots, r^{w_{n+(k-1)/2}})^T$$

The convolutional layer computes the j-th element of the vector $r_{q1}^{conv} \in R^{cl_u}$ as follows:

$$[r^{conv}_{q1}]_j = f\left(\max_{1 < n < N} [W^1 z_n + b^1]_j\right)$$

where $W^1 \in R^{cl_u \times dk}$ is the weight matrix of the convolutional layer and f is the hyperbolic tangent function. Matrices $W^0$ and $W^1$, and the vector $b^1$ are parameters to be learned. The word embedding size d, the number of convolutional units $cl_u$, and the size of the word context window k are hyper-parameters that are configurable, for example, to be chosen by the user.

Referring back to FIG. 1, at 110, a pool of questions may be retrieved. The pool of questions may be stored in a database, for example, associated with a Q&A system or the like. Each question from the pool of questions may be represented as CNN based distributed vector representation and weighted bag-of-words sparse representation.

At 112, semantic similarity using different representations may be computed. For each of, or a plurality of questions retrieved from the pool of questions, semantic similarity between the input question and the question from the pool may be computed. Consider input question as q1 and a question from the pool as q2. After the bag-of-words and convolutional-based representations are generated for the input pair (q1, q2), partial scores are computed. In one embodiment, the partial scores may be computed as the cosine similarity between the respective vectors:

$$s_{bow}(q_1, q_2) = \frac{r_{q_1}^{bow} \cdot r_{q_2}^{bow}}{\|r_{q_1}^{bow}\| \|r_{q_2}^{bow}\|}$$

$$s_{conv}(q_1, q_2) = \frac{r_{q_1}^{conv} \cdot r_{q_2}^{conv}}{\|r_{q_1}^{conv}\| \|r_{q_2}^{conv}\|}$$

The final score for the input questions (q1, q2) is given by the following linear combination:

$$s(q_1,q_2) = \beta_1 * s_{bow}(q_1,q_2) + \beta_2 * s_{conv}(q_1,q_2)$$

where $\beta_1$ and $\beta_2$ are parameters to be learned.

At 114, questions ranked by semantic similarity with the input question are output, for example, presented via a user interface, for example, over the Internet.

In one embodiment of the present disclosure, the weights and parameters of the different representations may be learned by machine learning. For example, a neural network may be trained to learn the weights and parameters. In one embodiment of the present disclosure, neural network training (machine learning) is performed with stochastic gradient descent (SGD) by minimizing a pair-wise ranking loss over a training set D. In one embodiment, backpropagation is used to update the network parameters, to compute the gradients of the network. The input in each round (or iteration) is two pairs of questions $(q_1, q_2)^+$ and $(q_1, q_x)^-$. The questions in the first pair are semantically equivalent and form a positive example. The questions in the second pair are not semantically equivalent and form a negative example. The difference of their similarity scores Δ, where $\Delta = s(q_1, q_2) - s(q_1, q_x)$, may be generated by the neural network with parameter set θ.

In one embodiment, the following pairwise ranking loss function is minimized with respect to θ:

$$L(\Delta,\theta) = \log(1 + \exp(-\gamma\Delta))$$

where,
γ is a scaling factor; and
θ is the set of parameters of the neural network. In one embodiment, the scaling factor, γ, may magnify Δ from [−2, 2], for example, in case of using cosine similarity) to a larger range. This helps to penalize more on the prediction errors. For instance, an example value of the scaling factor γ, may be 10.

Sampling informative negative examples can have an impact in the effectiveness of the learned model. As an example, multiple number of pairs of negative examples (e.g., 20) may be created for each positive pair $(q_1, q_2)^+$. To create a negative example, a question $q_x$ may be randomly sampled that is not semantically equivalent to $q_1$ or $q_2$, and negative pairs $(q_1, q_x)^-$ and $(q_2, q_x)^-$ may be created. The training phase, during each iteration, may then use the negative example x that produces the smallest different $s_\theta(q_1, q_2)^+ - s_\theta(q_1, q_x)^-$. This strategy selects more representative negative examples.

Using a ranking loss function in the training, the system and/or method of the present disclosure in one embodiment learns to represent questions while learning to rank them according to their semantic similarity.

In one embodiment, the elements of the BOW weight vector t are initialized with the IDF of each word in V computed over the question set Q. Different configurations of the BOW weight vector t may be used. For example, the t may be initialized with the value 1 (one) in all positions. In one embodiment, t may be allowed to be updated by the neural network. In another embodiment, t may stay the same as initialized.

In one embodiment, training, validation and test sets may be created. The number of instances in the training set may correspond to the number of positive pairs of semantically equivalent questions. The number of instances in the validation and the test sets may correspond to the number of questions which are used as queries. All questions in the validation and test set may contain at least one duplicated question in the set of all questions. Given a query question q, all questions in a Q&A community may be evaluated when searching for a duplicate of q.

In one embodiment, the word embeddings may be initialized by means of unsupervised pre-training. Pre-training may be performed using a Neural Language Model. Available online community data may be used to train word embeddings.

The hyper-parameters of the neural networks and the baselines may be tuned using development sets. Examples of selected hyper-parameter values may include, but are not limited to, those shown in Table 1.

TABLE 1

| Parameter Name | BOW-CNN |
|---|---|
| Word Embedding Size | 200 |
| Context Window Size | 3 |
| Convolution Units | 400 |
| Learning Rate | 0.01 |

In one embodiment, each element $[t]_i$ of the bag-of-word weight vector t with the IDF of i-th word $w_i$ computed over the respective set of questions Q may be as follows:

$$[t]_i = IDF(w_i, Q) = \log\frac{|Q|}{|q \in Q : w_i \in q|}$$

A hybrid neural network architecture of the present disclosure in one embodiment, e.g., BOW-CNN, combines bag-of-words with distributed vector representations created by a CNN, to retrieve semantically equivalent questions.

The system and/or method of the present disclosure in one embodiment joins the advantages of both bag-of-words representations and distributed representations learned with CNNs and provides better accuracy, for example, for large texts such as paragraphs and whole documents. The system and method of the present disclosure provides improvements to computer-implemented cognitive technology such as IBM Watson™ products, from International Business Machines Corporation, Armonk, N.Y., A system in one embodiment may include one or more computers and one or more user interfaces to the computers for receiving natural language text. A user interface, for example, is displayed or presented on a display device and/or an audio device, or another hardware device or component. A word order engine characterizes a plurality of natural language (NL) questions accounting for word order in the questions. A word no-order engine characterizes the NL questions not accounting for word order in the questions. A comparison engine compares a similarity between each of one or more of the questions to a target question by measuring the similarity with respect to both the word order characterizing and the non-word-order characterizing. The similarity is measured based on parameters determined by a trained neural network to predict the similarity. In one embodiment, the word order engine is a convolutional neural network. In one embodiment, the non-word-order engine is a "bag of words" engine. The questions with a fewer number of words weight the word order characterization higher and questions with a larger number of words weight the bag of words characterization higher.

Figure 3:
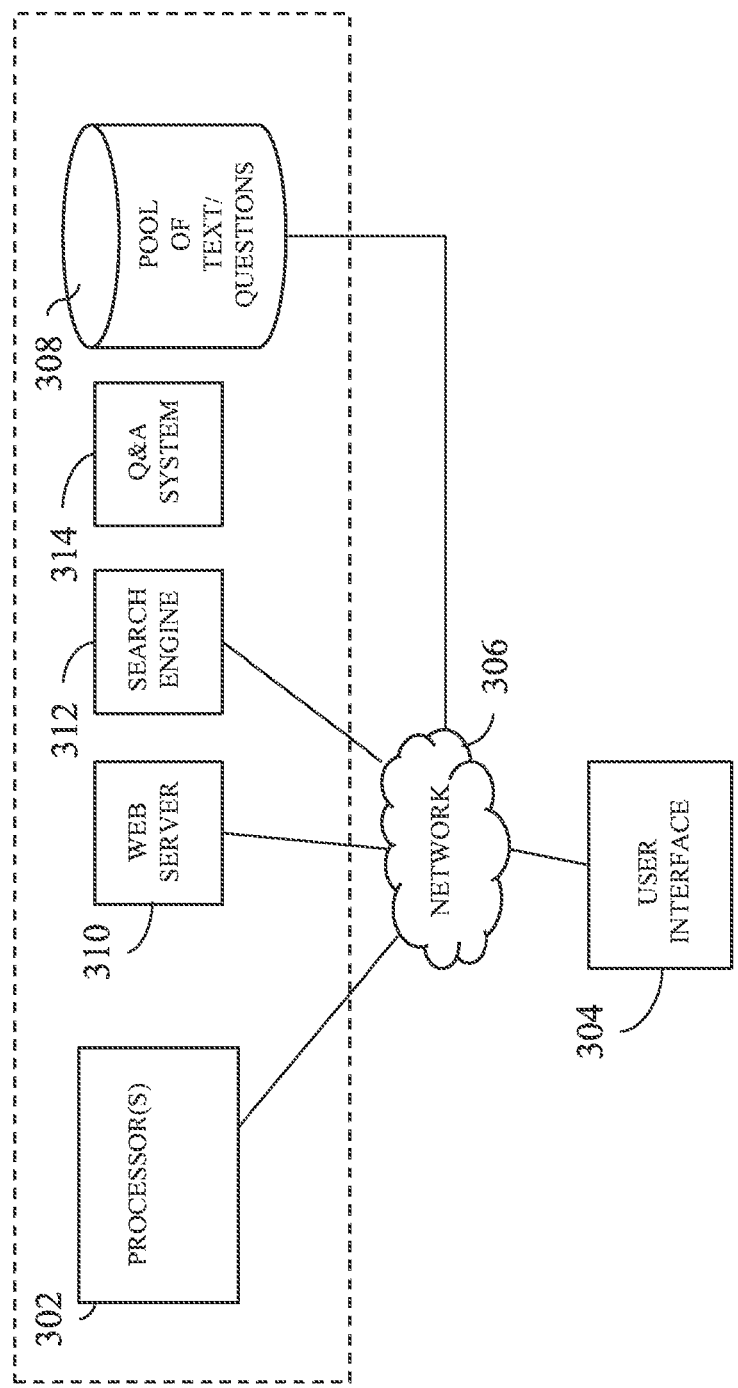
FIG. 3 is a diagram showing components of a system that learns hybrid representations and retrieves semantically equivalent questions in one embodiment of the present disclosure.

FIG. 3 is a diagram showing components of a system that learns hybrid representations and retrieves semantically equivalent questions in one embodiment of the present disclosure. One or more hardware processors 302 may implement a methodology of the present disclosure, for example, of training a neural network for hybrid representation of questions and for determining semantic similarity between questions. A user, for example, via a user interface 304, may enter a question in natural language and request from one or more of the hardware processors 302, to find semantically similar questions.

The user interface 304, for example, may be a browser, a web browser for example, that displays a user interface page of a web site provided, for example, provided by a web server 310 in communication with a search engine system 312 and/or Q&A community system 314, for instance which search for answers to questions.

One or more of the hardware processors 302 receives the question (referred to as a first question for sake of explanation only), and parses the question into tokens, for example, using a natural language processing technique or another computer-implemented technique. The question may be received over a communication network 306, for example, over the Internet or another network. As another example, the question may be received from a user interface running locally on one or more of the hardware processors 302.

One or more of the hardware processors may generate hybrid representations of the question. Hybrid representations in one embodiment are stored in memory as in-memory representations. For instance, a weighted bag of words representation of the first question is created based on the tokens and stored in memory. The weights associated with the bag of words are determined from training a neural network to learn the weights over a training set of questions or texts. Convolutional neural networks based distributed vector representation of the first question is generated based on the tokens and stored in memory. The parameters of the convolutional neural networks based distributed vector representation are determined from training the neural network to learn the parameters over a training set of texts.

The hybrid representations are then used to find similar questions from a pool of questions 308, for example, stored in a database or storage device. For example, one or more hardware processors 304 may retrieve a question (referred to as a second question for sake of explanation only) from the pool of questions 308. The second question is also characterized with hybrid representations, for example, the second question is also represented in weighted bag of words representation and convolutional neural networks based distributed vector representation, stored in memory.

One or more hardware processors 304 may determine semantic similarity between the first question and the second question as a function of a first similarity computed based on the in-memory weighted bag of words representations of the first question and the second question, and a second similarity computed based on the in-memory convolutional neural networks based distributed vector representations of the first question and the second question. The parameters attributed to the first similarity and the second similarity in the function (referred to as function parameters for sake of explanation only) are learned by the neural network. Semantic similarity may be determined between each of a plurality of the questions retrieved from the pool of questions and the first question. A ranked list of second questions may be presented based on the semantic similarity determined between the first question and each of the second questions.

The identification of a similar question may automatically drive a machine, for example, a search engine, to redirect its search for an answer, for example, crawl to a place or location in the computing network, e.g., the Internet, where one or more of those similar questions may have been answered before, or where the answer may be stored.

Identifying a similar question, for example, which has been posed previously to the Q&A system, before posting or posing a new question, allows for efficiency in computing resources, for example, in a search engine or like computer component that searches or crawls the network of computers in an attempt to find an answer. For instance, the amount of processing and resource usage may be reduced, if it is known that the question has been answered previously.

In one embodiment, the neural network is trained based on minimizing a pair-wise ranking loss function over a training set using stochastic gradient descent. Backpropagation computes gradients of the neural network for updating neural network parameters. For instance, two pairs of training set questions comprising one pair of questions representing a positive example and another pair of questions representing a negative example may be input at each iteration of the backpropagation during training. The hardware memory representation of the neural network is transformed as the parameters are learned and updated, for example, via backpropagation.

Figure 4:
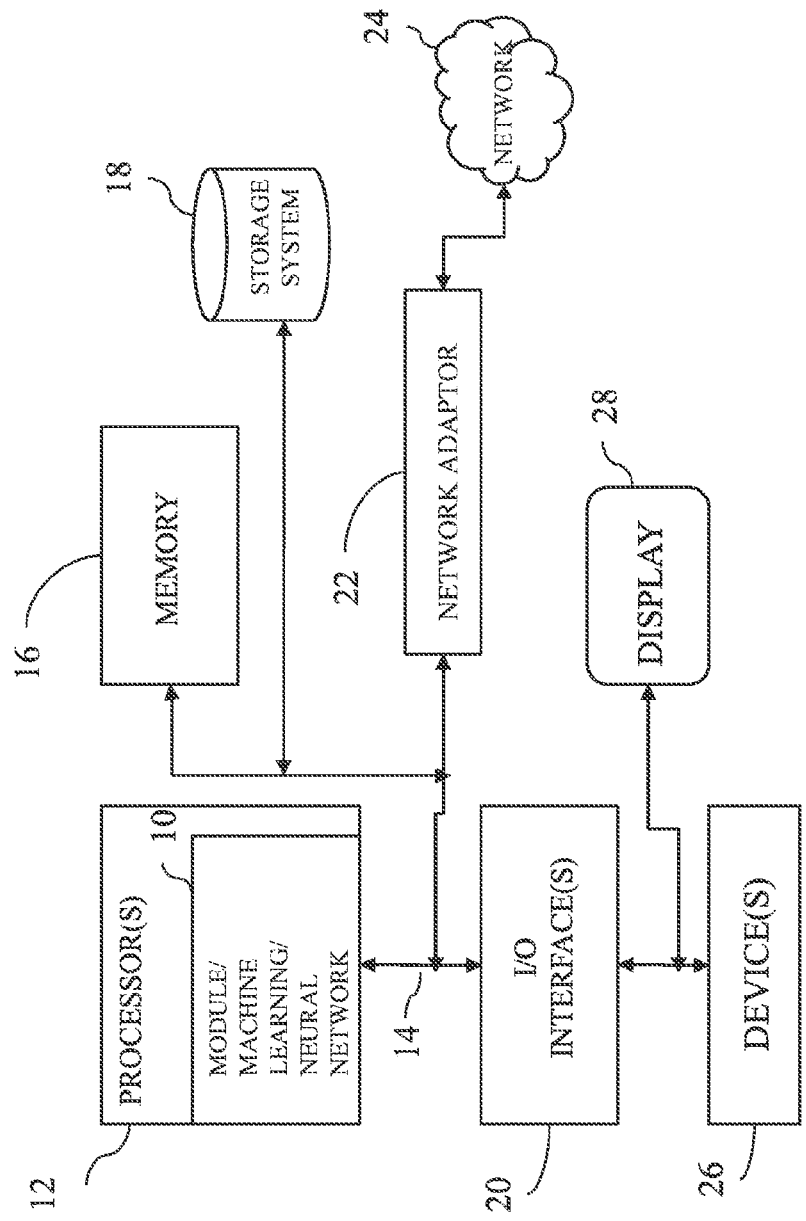
FIG. 4 illustrates a schematic of an example computer or processing system that may implement a system that trains a computer-implemented neural network to represent text in hybrid representation and retrieve similar text in one embodiment of the present disclosure.

FIG. 4 illustrates a schematic of an example computer or processing system that may implement a system that retrieves semantically equivalent questions or text by machine learning in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of searching for semantically equivalent questions using hybrid representations in a computer-implemented community of question and answer system, the method performed by one or more hardware processors, comprising:

receiving a first question in natural language via a user interface;

parsing the first question into tokens using a natural language processing technique;

generating in-memory weighted bag of words representation of the first question based on the tokens, wherein weights associated with the bag of words are determined by training a neural network to learn the weights;

generating in-memory convolutional neural networks based distributed vector representation of the first question based on the tokens, wherein parameters of the convolutional neural networks based distributed vector representation are determined by training the neural network to learn the parameters;

retrieving a second question from a pool of questions stored in a storage device, wherein the second question represented in different representations comprising in-memory weighted bag of words representation and in-memory convolutional neural networks based distributed vector representation; and determining semantic similarity between the first question and the second question as a function of a first similarity computed based on the in-memory weighted bag of words representations of the first question and the second question, and a second similarity computed based on the in-memory convolutional neural networks based distributed vector representations of the first question and the second question, wherein parameters attributed to the first similarity and the second similarity in the function are learned by the neural network, wherein hardware memory representation of the neural network is transformed as the parameters are learned and updated, the first question represented in different representations comprising the in-memory weighted bag of words representation and the in-memory convolutional neural networks based distributed vector representation.

2. The method of claim 1, wherein a plurality of second questions are retrieved from the pool of questions, and the determining semantic similarity is performed for each of the plurality of second questions.

3. The method of claim 2, wherein a ranked list of second questions are presented based on the semantic similarity determined between the first question and each of the second questions.

4. The method of claim 1, wherein the user interface comprises a browser associated with a search engine web site.

5. The method of claim 1, wherein the neural network is trained based on minimizing a pair-wise ranking loss function over a training set using stochastic gradient descent.

6. The method of claim 5, wherein backpropagation computes gradients of the neural network for updating neural network parameters, wherein two pairs of training set questions comprising a positive example and a negative example are input at each iteration of the backpropagation.

7. A computer readable storage medium storing a program of instructions executable by a machine to perform a method of searching for semantically equivalent questions using hybrid representations in a computer-implemented community of question and answer system, the method comprising:

receiving a first question in natural language via a user interface;

parsing the first question into tokens using a natural language processing technique;

generating in-memory weighted bag of words representation of the first question based on the tokens, wherein weights associated with the bag of words are determined by training a neural network to learn the weights;

generating in-memory convolutional neural networks based distributed vector representation of the first question based on the tokens, wherein parameters of the convolutional neural networks based distributed vector representation are determined by training the neural network to learn the parameters;

retrieving a second question from a pool of questions stored in a storage device, wherein the second question is represented in in-memory weighted bag of words representation and in-memory convolutional neural networks based distributed vector representation; and determining semantic similarity between the first question and the second question as a function of a first similarity computed based on the in-memory weighted bag of words representations of the first question and the second question, and a second similarity computed based on the in-memory convolutional neural networks based distributed vector representations of the first question and the second question, wherein parameters attributed to the first similarity and the second similarity in the function are learned by the neural network, wherein hardware memory representation of the neural network is transformed as the parameters are learned and updated.

8. The computer readable storage medium of claim 7, wherein a plurality of second questions are retrieved from the pool of questions, and the determining semantic similarity is performed for each of the plurality of second questions.

9. The computer readable storage medium of claim 8, wherein a ranked list of second questions are presented based on the semantic similarity determined between the first question and each of the second questions.

10. The computer readable storage medium of claim 7, wherein the user interface comprises a browser associated with a search engine web site.

11. The computer readable storage medium of claim 7, wherein the neural network is trained based on minimizing a pair-wise ranking loss function over a training set using stochastic gradient descent.

12. The computer readable storage medium of claim 11, wherein backpropagation computes gradients of the neural network for updating neural network parameters, wherein two pairs of training set questions comprising a positive example and a negative example are input at each iteration of the backpropagation.

13. A system of searching for semantically equivalent questions using hybrid representations in a computer-implemented community of question and answer system, comprising:

one or more hardware processors operable to receive a first question in natural language via a user interface over a communication network, one or more of the hardware processors further operable to parse the first question into tokens using a natural language processing technique, one or more hardware processors further operable to generate in-memory weighted bag of words representation of the first question based on the tokens, wherein weights associated with the bag of words are determined by training a neural network to learn the weights, one or more hardware processors further operable to generate in-memory convolutional neural networks based distributed vector representation of the first question based on the tokens, wherein parameters of the convolutional neural networks based distributed vector representation are determined by training the neural network to learn the parameters, one or more hardware processors further operable to retrieve a second question from a pool of questions stored in a storage device, wherein the second question is represented in in-memory weighted bag of words representation and in-memory convolutional neural networks based distributed vector representation, one or more hardware processors further operable to determine semantic similarity between the first question and the second question as a function of a first similarity computed based on the in-memory weighted bag of words representations of the first question and the second question, and a second similarity computed based on the in-memory convolutional neural networks based distributed vector representations of the first question and the second question, wherein function parameters attributed to the first similarity and the second similarity in the function are learned by the neural network, wherein hardware memory representation of the neural network is transformed as the parameters are learned and updated.

14. The system of claim 13, wherein a plurality of second questions are retrieved from the pool of questions, and the determining semantic similarity is performed for each of the plurality of second questions.

15. The system of claim 14, wherein a ranked list of second questions are presented based on the semantic similarity determined between the first question and each of the second questions.

16. The system of claim 13, wherein the user interface comprises a browser associated with a search engine web site.

17. The system of claim 13, wherein the neural network is trained based on minimizing a pair-wise ranking loss function over a training set using stochastic gradient descent.

18. The system of claim 17, wherein backpropagation computes gradients of the neural network for updating neural network parameters, wherein two pairs of training set questions comprising a positive example and a negative example are input at each iteration of the backpropagation.

19. The system of claim 13, wherein one or more of the hardware processors automatically redirects a search engine to crawl in a location in a computer network based on the ranked list of second questions determined to have semantic similarity.

* * * * *